Dec. 24, 1963  E. DENZLER ETAL  3,115,570
RESISTANCE SPOT WELDING APPARATUS
Filed June 6, 1961
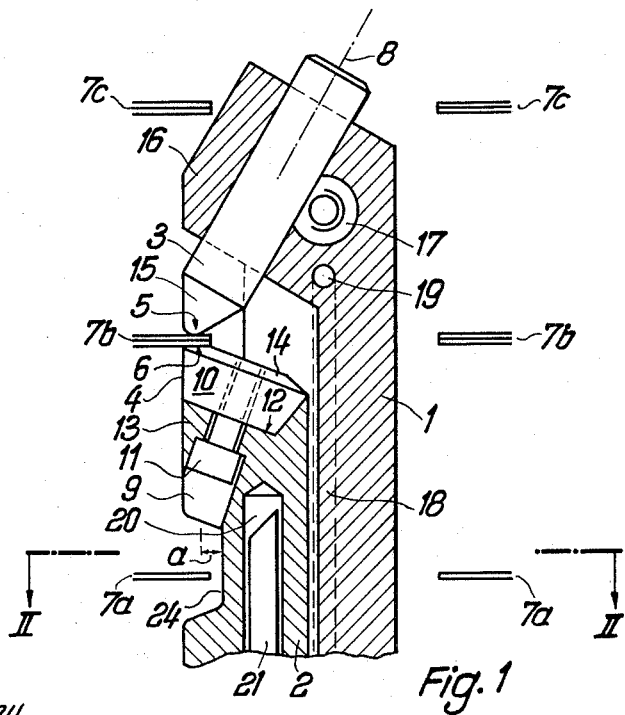
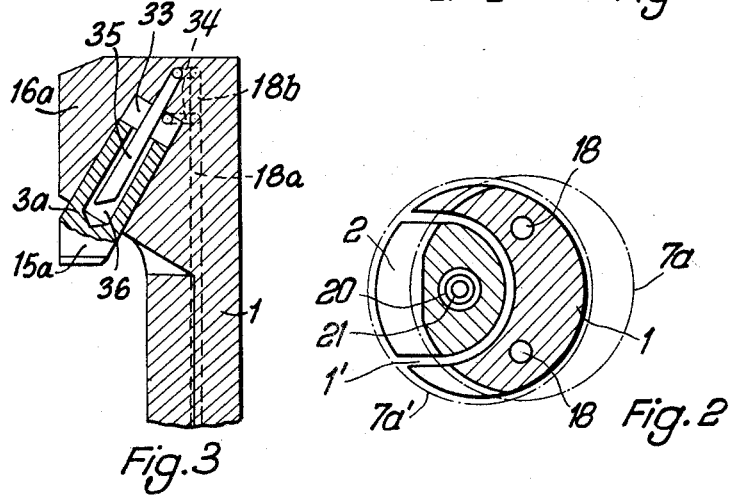
Fig.1
Fig.3
Fig.2
Inventor:

United States Patent Office 3,115,570
Patented Dec. 24, 1963

3,115,570
RESISTANCE SPOT WELDING APPARATUS
Emil Denzler, Schlieren, Zurich, Eugen Robe, Zollikerberg, Zurich, and Rolf Suter, Meilen, Zurich, Switzerland, assignors to H. A. Schlatter A.G., Zurich, Switzerland
Filed June 6, 1961, Ser. No. 115,115
14 Claims. (Cl. 219—78)

The present invention relates to a resistance spot welding apparatus for welding metal sheets or bars and is more particularly concerned with welding apparatus of this type which is suitable for resistance spot welding operations at points which are usually accessible only with great difficulty.

The resistance spot welding apparatus of the present invention comprises two electrode supports which are slideable longitudinally of each other and each carries at its outer end a welding electrode in confronting relationship with the welding electrode of the adjacent support. The arrangement and shape of these electrode supports are especially suitable for spot welding operations along the edges of openings which are recessed in a work piece or other structure.

Resistance spot welding apparatus for welding operations at difficultly accessible points at which the two electrode supports are movable relative to each other are known, but in these arrangements the contact or welding surfaces of the electrodes are located outside the cross-sectional area of the electrode supports so that a relatively large opening is required in order to introduce the welding apparatus into the interior of the work piece. In other heretofore known resistance welding apparatus of this type the electrode contact surfaces are arranged within the cross-sectional area of the two electrode supports but the two supports are disposed at a greater distance from each other or in a less compact manner so that also in this type of apparatus the introduction of the welding device through very narrow openings into a work piece is difficult or even impossible.

In the resistance spot welding apparatus according to this invention both electrode supports are of rectilinear or elongate configuration. The outer electrode support extends beyond the inner electrode support and is provided with an end portion which projects over the inner electrode support member. The electrode of the outer electrode support is mounted in this end portion of the outer electrode support. The outer electrode support is provided with a semi-circular or concave recess or groove which extends up to the end portion of the outer electrode support. The major portion of the inner electrode support is disposed in the concave recess of the outer support and is spaced therefrom by a narrow slit. The combined cross-section of the two electrode supports is substantially elliptical in the working portion of the apparatus and includes all the operating elements for the welding operation. The geometrical axes of the electrodes are inclined relative to the longitudinal direction of the electrode support. The projection of the contact surfaces of the two electrodes on a plane which is perpendicular to the longitudinal direction of the electrode supports is disposed within the substantially elliptical cross-section at the edge thereof.

It is therefore an object of the present invention to provide a resistance spot welding apparatus in which the electrode contact or welding surfaces are arranged within the cross sectional area of the electrode support members.

It is another object of the present invention to provide a resistance spot welding apparatus in which the two associated electrode supports are disposed relative to each in a more compact and space saving arrangement.

Additional objects and features of the present invention will become apparent from the following description taken in conjunction with the accompanying drawing in which an embodiment of the invention is shown as example only, and in which—

FIG. 1 a longitudinal cross-section through the upper portion of a welding head according to the invention.

FIG. 2 is a cross-section along line II—II of FIG. 1,

FIG. 3 is a longitudinal section through a modification of the invention showing the outer electrode support and its associated electrode.

Referring now to FIGS. 1 and 2 of the drawing reference numeral 1 designates the outer electrode support and numeral 2 designates the inner electrode support. Electrode support 1 is provided with an end portion 16 which extends over the inner electrode support 2 and its end portion 13. The two electrode supports are longitudinally slideable either together or independently of each other in a suitable manner (not shown). In the position shown in the drawing electrode 3 of the outer support member 1 and electrode 4 of the inner support member 2 engage a work piece 7b which is to be welded by means of their respective welding or contact surfaces 5 and 6. In this position the projection of the contact surfaces of the electrodes engaging the work piece are spaced with reference to the cross-sectional plane II—II a distance $a$ from the cross-section of the support 2 which is most proximate thereto.

As best seen in FIG. 2 of the drawing the support 1 is provided with a longitudinally extending concave recess or groove 1'. The upper portion of support 2 is arranged in this groove 1'. Supports 1 and 2 have a combined cross-section which is approximately circular. In the plane II—II of FIG. 1 this cross-section is approximately elliptical while support 1 alone is substantially sickle or crescent-shaped in cross-section.

Each of the electrodes 3 and 4 is of such a form that they are rotatable around their longitudinal axes 8 and 9 respectively, which are inclined relative to the longitudinal direction of the supports 1 and 2. A desired portion of the surface of the electrodes may be used as contact surface for engaging the work piece by an appropriate rotation of the individual electrodes. Each electrode may be locked or clamped in position by any suitable means.

The electrode 4 has the form of a double frustocone comprising a lower truncated cone portion 10 which is clamped by means of an axially extending releasable screw 11 against an abutment surface 12 of the electrode end 13 of electrode 4, and an upper truncated cone having a conical surface 14 which constitutes the welding or contact surface 6 for engaging one of the work pieces 7b. The axis 9 of electrode 4 forms relative to the longitudinal direction of the support members an angle which corresponds to half the angle formed at the geometrical point of the truncated portion 10.

Electrode 3 is of cylindrical form and is provided at the end adjacent the welding point with a conical surface 15. The electrode is adjustably mounted in a bore of the electrode end portion 16 and may be maintained in position by suitable clamping means. The electrode end portion 16 consists of two semi-cylindrical shells or sleeves separated by a slot (not shown). These semi-cylindrical sleeves enclose the electrode 3 and may be tightened by any suitable means such as a screw 17 so as to securely hold this electrode in position. The axis 8 of electrode 3 forms relative to the longitudinal direction of the support members an angle which is equal to half the angle at the point of the cone which comprises the conical surface 15, in order that the surface area of the conical surface 15 directed away from the support 1 may extend parallel to the longitudinal axis of this support. In this position the point of the cone is directed away from the support member 1.

As shown in FIG. 1 the axes of the two electrodes 3 and 4 are inclined in the same direction relative to the longitudinal direction of supports 1 and 2.

Two cooling canals 18 are provided in support 1 which extend in the longitudinal direction of this support member into the proximity of the electrode end portion 16 and are inter-connected by means of a bore 19. Support 2 is also provided with two cooling canals, one of which is formed by a bore 20 and the other by a tubular section 21 which is disposed coaxially of the bore in spaced relationship thereto.

At the end opposite electrode end portions 13 and 16 the supports 1 and 2 respectively are connected to conventional means (not shown) for providing the input and output of the welding current and of the cooling medium as well as to means for producing the longitudinal movement of the supports 1 and 2 relative to each other and the combined movement of the two electrodes. These means for moving the electrode supports are utilized for transferring the electrodes to the welding point, for pressing them against the work pieces and for conducting them from one welding point to another or longitudinally of the welding seam.

In order to produce circular welding seams the pair of electrodes is rotatable around an axis which is parallel to the longitudinal direction of the supports 1 and 2 and the distance of this axis from the welding surfaces 5 and 6 which engage the work pieces 7b in the work position of the electrodes 3 and 4 is adjustable.

In order to produce several welding operations simultaneously the machine may be provided in a known manner with several welding heads according to the invention the relative distance between these devices being adjustable in order to adapt them to the requirements of the particular work piece. In this arrangement common driving and control means for producing the working movements of the electrode supports and for regulating the welding currents may be provided for a plurality of welding heads. In particular several welding heads may be coupled together.

The construction and arrangement of the electrodes, the means for securing them in position as well as their support members form a minimum cross-section perpendicularly of the longitudinal direction of the support members and their elements are generally of small dimensions. Therefore it is possible to introduce the electrodes into welding areas which are difficultly accessible and to execute welding operations even under very unfavorable space conditions.

In order to produce a welding for example at the edge of an opening having a relatively small diameter whose diametrically opposed edge portions are indicated in FIG. 1 by numeral 7b, the electrode 3 is introduced with the end portion 16 in which it is mounted through the opening between the edge portions 7b. The oppositely facing surface lines of support 1 and of the conical surface 15 are conducted in close proximity between the edges 7b, and the electrode 3 engages the welding point at one side of the work piece and electrode 4 on the other side of the work piece. The opening is required only to be large enough on one side so that electrode 3 may be introduced therein. On the other side of the opening it is necessary to have a space which is large enough to accommodate electrode 3 and its supporting end 16, and it is sufficient that it be accessible only through this one opening.

The apparatus according to the invention is also suitable for producing a welding at the edges of adjacent openings of two hollow bodies, if these openings are accessible through a third opening of one of these hollow bodies in a vertical direction. The welding of individual hollow sections of radiators along the edges of the flow passages of these sections is an example of such a welding operation. FIG. 1 of the drawing indicates such an edge portion 7a, and 7b designates a pair of such edge portions which are disposed adjacent each other and are to be welded together, while 7c designates a pair of such edge portions of hollow sections of a radiator already welded together. In order to weld the pair of edge portions 7b both electrodes 3 and 4 are introduced by means of their supports 1 and 2 through the opening at 7a far enough that support 1 extends also through the opening at 7b. During the introduction of the electrodes the oppositely facing outside surfaces of the support 1 and of conical surfaces 10 and 15 as well as of support 2 are conducted in close proximity to the edges of the edge portion 7a, and the oppositely facing outer surfaces of support 1 and of conical surface 15 are conducted in close proximity to the edges of the pair of edge portions 7b. During this introduction of the welding supports the edge portion 7a and the pair of edge portions 7b and 7c are in the position which is shown in FIG. 2 by a dotted-line circle 7a'. Subsequently the electrode 3 is placed on the welding point at one side of the pair of edge portions 7b while electrode 4 engages the other side of this pair of edge portions. A recessed portion 24 of support 2 prevents this support from contacting the edge portion 7a. The position of edge portion 7a and that of the pairs of edge portions 7b and 7c relative to the supports 1 and 2 in the operating position of the electrodes is illustrated in FIG. 2 of the drawing by a dotted-line circle 7a.

The embodiment of FIG. 3 of the drawing shows an electrode end portion 16a which is provided with a conical bore 33. The inner end of this bore is connected by means of a canal 34 to a canal 18a. An additional canal 18b runs parallel to canal 18a, in the postion shown in the drawing behind canal 18a, and it extends beyond this canal at the upper end shown in FIG. 3. This canal 18b communicates with an open pipe 35 which is disposed coaxially in bore 33. The electrode 39 which is associated with the electrode end portion 16a is press fitted in bore 33 and has a hollow cylindrical space 36 which is adapted to receive a pipe 35 in spaced relationship. A suitable coolant is conducted to one of canals 18a and 18b from which it is then discharged through the other canal.

This modification of the electrode end portion 16a and of the electrode 3a has the advantage of providing a direct cooling of the electrode.

In this modification the electrode 3a is not axially adjustable. But this arrangement has the advantage of a substantially smaller geometrical dimension so that the minimum opening through which the welding device has to be introduced can be even smaller than the opening for the embodiment shown in FIG. 1. This is the case for example when elements which have an inlaid threaded ring are to be welded.

At least one of supports 1 and 2 of the welding apparatus is suitably slideable in a known manner into its working position in two steps, the engaging step and the welding step.

While the invention has been described in detail with reference to the specific embodiments shown, various changes and modifications will become apparent to a person skilled in the art which fall within the spirit of the invention and scope of the appended claims.

What is claimed is:

1. A resistance spot welding apparatus comprising oppositely disposed welding electrodes, outer and inner support means for mounting said oppositely disposed welding electrodes in slideable relationship to each other, said welding electrodes being arranged within the cross-sectional limits of said support means, said outer support means having a recessed portion for receiving said inner support means, said inner support means being substantially enclosed within the cross-sectional limits of said outer support means.

2. A resistance spot welding apparatus comprising elongate support means slideable relative to each other, welding electrodes mounted on said elongate support means, a recessed portion in one of said support means for receiving the other of said support means in spaced relation thereto, said welding electrodes extending into said recessed portion in confronting relationship, said one elongated support means substantially enclosing said other support means in said recess, said welding electrodes being confined to the cross-sectional limits of said support means, said electrodes having appropriately formed contact surfaces, the projection of said contact surfaces extending parallel to the longitudinal direction of said support means at the edge of said cross-sectional limits.

3. A resistance spot welding apparatus comprising spaced parallel elongate supports slideable relative to each other, a substantially concave longitudinal recess in one of said elongate supports, a substantially convex longitudinal portion on the other of said elongate supports and disposed in said recess in spaced relationship to said one support, an end portion on said one support projecting over said recessed portion, a first welding electrode secured to said end portion and extending into said recessed portion, a second welding electrode secured to said other support and extending into said recessed portion confronting said first electrode, said one support substantially containing said other support within said recessed portion, said welding electrodes being confined to the cross-sectional limits of said elongate supports.

4. A resistance spot welding apparatus comprising a first elongate support having a substantially concave longitudinal recess, said first elongate support having a free end portion projecting over said concave recess, a first welding electrode adjustably mounted in said free end portion and extending into said recess, a second elongate support slideably mounted adjacent said first elongate support, said second elongate support having a longitudinally extending essentially convex portion contained substantially within said concave recess, a second welding electrode secured to the free end of said second support opposite said first welding electrode, said welding electrodes being disposed in said recess within the cross-sectional limits of said elongate supports, and cooling canals for cooling said elongate supports.

5. A resistance spot welding apparatus comprising a first elongate support having a substantially concave longitudinal recess, said elongate support having a free end projecting over said concave recess, a cylindrical welding electrode slideably mounted in said free end portion and extending into said recess, said cylindrical welding electrode having a conical welding surface, a second elongate support slideably mounted adjacent said first elongate support and substantially contained in said longitudinal recess, a second welding electrode secured to said second support, said second welding electrode having a frusto-conical surface confronting said other electrode constituting the welding surface of said second electrode, said welding electrodes being disposed in said recess within the cross-sectional limits of said elongate supports.

6. A resistance spot welding apparatus comprising in combination an outer elongate support having a substantially concave longitudinal recess, said outer elongate support having a slotted compressible free end portion projecting over said concave recess, a first cylindrical outwardly directed welding electrode slideably mounted in said free end portion and extending into said recess, clamping means for compressing said slotted end portion to secure said first welding electrode in position, said first welding electrode having a conical welding surface, an inner elongate support slideably mounted adjacent said outer elongate support and substantially contained in said longitudinal recess, a second inwardly directed welding electrode secured to said inner support, means for securing said second welding electrode on said inner elongate support, said second welding electrode consisting of two oppositely directed upper and lower frusto-cones, the peripheral surface of the upper frusto-cone confronting said other electrode and constituting the welding surface of said inner electrode, said welding electrodes being confined to the cross-sectional limits of said elongate supports, and cooling canals for cooling said elongate supports.

7. A resistance spot welding apparatus as defined in claim 3 wherein said elongate supports have communicating canals for circulating coolant through said supports.

8. A resistance spot welding apparatus as defined in claim 3 wherein said elongate supports have a substantially elliptical cross-section of short longitudinal extent below said second welding electrode.

9. A resistance spot welding apparatus as defined in claim 4 wherein said welding electrodes are rotatable.

10. A resistance spot welding apparatus as defined in claim 4 wherein said first welding electrode is fixedly mounted to said end portion and wherein said cooling canals extend into said fixedly mounted electrode.

11. A resistance spot welding apparatus as defined in claim 4 wherein said second elongate support is recessed in its outwardly facing portion below said welding electrode.

12. A resistance spot welding apparatus as defined in claim 5 wherein the axes of said welding electrodes extend at an angle to the axis of said elongate supports.

13. A resistance spot welding apparatus as defined in claim 6 wherein the outer edge portion of the conical welding surface of said first electrode and the outer edge portion of the lower frusto-cone of said second electrode are disposed parallel to the outer edge portion of said outer and inner supports and substantially in the same plane.

14. A resistance spot welding apparatus as defined in claim 6 wherein the base diameter of the frusto-cone constituting the welding surface of said second electrode is larger than the base diameter of the cone constituting the welding surface of said first electrode.

References Cited in the file of this patent

UNITED STATES PATENTS

| | | |
|---|---|---|
| 1,280,818 | Nikonow | Oct. 8, 1918 |
| 1,884,222 | Ragsdale | Oct. 25, 1932 |
| 1,946,445 | Ragsdale et al. | Feb. 6, 1934 |
| 2,467,629 | O'Neill | Apr. 19, 1949 |
| 2,542,629 | Clawson | Feb. 20, 1951 |